United States Patent Office 3,530,520
Patented Sept. 29, 1970

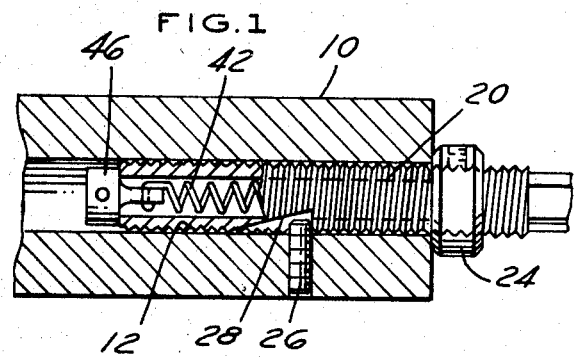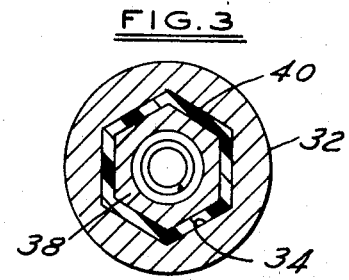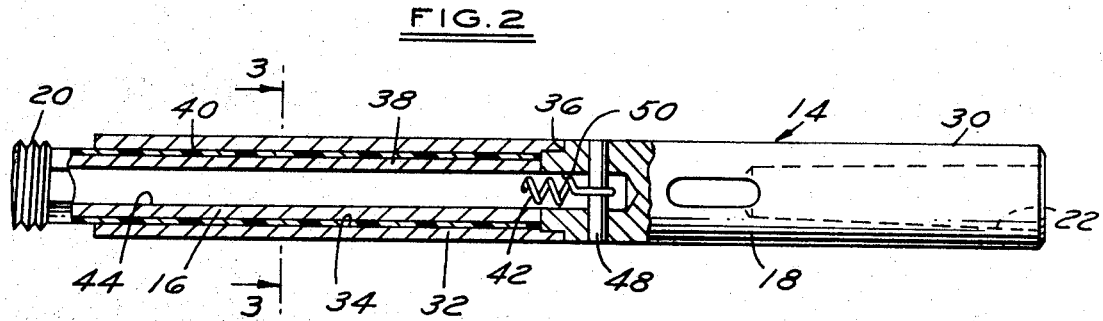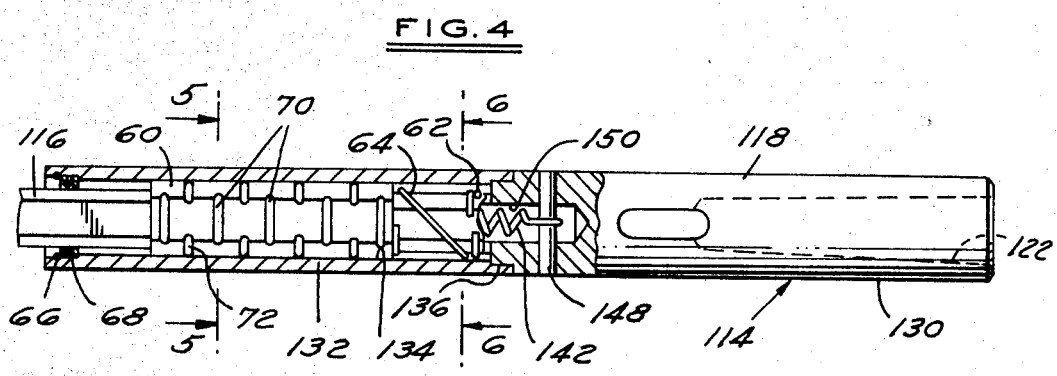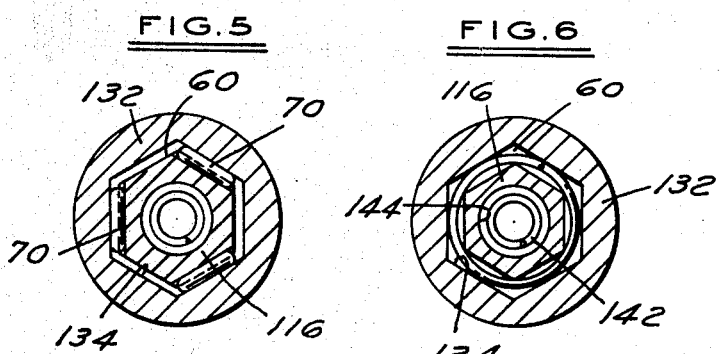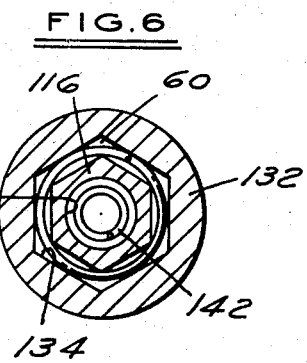

1

3,530,520
TAP DRIVER
Victor Milewski, Birmingham, and Clifford Earl Cobb, Detroit, Mich., assignors to The Valeron Corporation, a corporation of Michigan
Filed Jan. 15, 1968, Ser. No. 697,932
Int. Cl. B23g 1/00, 5/00, 5/14
U.S. Cl. 10—129
7 Claims

ABSTRACT OF THE DISCLOSURE

Tap drivers for thread cutting tools and comprising telescopically engaged members having complementary polygonal shapes, for providing a rotary drive connection therebetween, and with means disposed between the driving and driven parts to minimize frictional resistance to relative axial movement in the course of rotary drive.

BACKGROUND OF THE INVENTION

Tapping tools, for cutting threads in a bore hole, perform best when allowed to pull themselves through a work piece. Accordingly, they are most frequently used with either a machine having a spring loaded spindle, to allow the spindle to be advanced with the tool, or with a floating tap driver which is a tool holder that allows for relative axial movement between spindle retained and tool holding parts of the holder itself.

Most tap drivers include a pair of cylindrical shaped parts which are telescopically engaged together and have some means for providing a rotary drive connection therebetween which will not interfere with the freedom of axial movement desired. The cylindrical shape of the tap driver parts is used because it is easiest to form within close tolerances, for axial alignment purposes, and there is low frictional resistance to relative axial movement. Similarly, cross pins in an elongated slot or a series of ball bearings in matching keyways, serving as raceways, have been used for the drive connection because of their relative simplicity and a like minimal resistance to axial movement.

Although the cross pin and ball bearing drive connections are adequate under normal operating conditions, they are not capable of withstanding the severe shock loads that occur when a tap freezes in a work piece. Consequently, since this happens quite frequently, a stronger but no less friction free drive connection has become highly desirable in this type of tooling.

SUMMARY OF THE INVENTION

This invention relates to tool holders in general and more particularly to floating tap drivers which afford relative freedom of axial movement between telescopically engaged parts of the holder while providing for a circumferential distribution of drive and reactionary forces in their use.

In the simplest form of the present invention a holder part is made for interfitting engagement with a spindle driven part by having interfacial engagement therewith, circumferentially about and between the two parts. A hexagonal shape has been found to be the most practical and to provide the necessary compromise between a spline-like connection having direct drive facial engagement, with high frictional resistance to axial movement, and the relatively friction free cylindrical shape that re-

2 quires other means of connecting the parts for drive. To further enhance the freedom of axial movement between the interfitted parts, a Teflon or like hard-wearing coating is provided on one of the parts and the two parts are lapped, as necessary for close fitting alignment.

The hexagonal shaped hole is broached in the spindle driven part of the holder or the holder part may be made in two separate halves, the inner wall forms provided by milling, grinding or otherwise, and then the two parts may be seam welded or otherwise retained together, where production demands do not justify more expensive tooling costs.

A second form of the present invention includes interfitting telescopic parts, which are also hexagonal in shape, with a roller bearing cage interposed between the two parts and roller bearings to provide for rolling contact between the two parts in the course of their relative axial movement. The roller bearings are disposed at staggered positions circumferentially about and between the ends of the cage member to spread the reactionary load, when a tap freezes, and as relatively aligned between alternate side faces of the drive connected parts, in the hexagonal form, they assure both concentricity and a balanced absorption of reactionary loads.

DESCRIPTION OF THE DRAWINGS

FIG. 1 is a cross-sectioned side elevational view of the end of a spindle showing the shank of a floating tap driver engaged therein, FIG. 2 is a cross-sectioned side elevational view of one form of tap driver as taught by the present invention, FIG. 3 is a cross-sectional view taken in the plane of line 3—3 of the last mentioned drawing figure and looking in the direction of the arrows.

FIG. 4 is a cross-sectioned side elevational view of another type of tap driver as taught by the present invention, and FIGS. 5 and 6 are cross-sectional views taken in the planes of lines 5—5 and 6—6, respectively, of the last mentioned drawing figure and looking in the direction of the arrows.

DETAILED DESCRIPTION

The tap drivers of the present invention are of the type which include a pair of axially aligned and telescopically engaged members with one adapted to hold the thread cutting tool, or tap, and the other for engagement with a machine tool spindle or adapter. The spindle driven member or part is fixed against axial movement, relative to the machine tool spindle, and is adapted to impart rotary drive to the tool holder member. The tool holder member or part is, in turn, fitted to the spindle driven member in a manner which enables it to move relatively freely in an axial direction with respect thereto. Accordingly, the tap in the tool holder part is able to pull itself through a work piece, while being driven by the machine tool spindle, and to establish its own rate of feed.

In the particular embodiments hereinafter discussed, attention is to be given to the form of the interconnection between the telescopically engaged parts of the tap drivers and whereby the rotary drive is obtained between the two parts. The connection is one which includes the benefits of a splined connection without the adverse frictional resistance to axial movement which results from direct drive force engagement between intermating splined parts. It also enables greater concentricity in the axial alignment of the relatively movable parts, approaching that of a cylindrical part in a plane surfaced bore, while providing a circumferential engagement between the tap driver parts having greater resistance to reactionary forces, as when a tap freezes in a work piece.

In the drawings, the end of a machine tool spindle or adapter 10 is shown in the first drawing figure. It has a plane surfaced bore 12 provided centrally therewithin and is adapted to receive the shank 20 of the tap driver 14, shown in the second drawing figure.

The tap driver 14 includes a spindle driven part 16 and a tool holder part 18. The spindle driven part includes the shank 20 received in the machine tool spindle or adapter 10 and the tool holder part is formed to include a tapered socket 22 receptive of the thread cutting tap, which is not shown.

The shank 20 of the spindle driven part is formed to include Acme threads and has a stop nut 24 provided thereon. A set screw 26 in the spindle or adapter 10 is disposed for engagement in a whistle notch 28 provided in the shank 20 and, with the shouldered engagement of the stop nut 24 with the end of the spindle or adapter 10, fixes the spindle driven part 16 of the tap driver against axial movement and for rotary drive with the machine tool spindle.

The tool holder part 18 of the tap driver is cylindrical in shape, externally, and includes an end 30, in which the tool socket 22 is provided, and a body part 32 receptive of the spindle driven part 16. The latter is broached or otherwise formed, as later discussed, to include a hexagonal bore 34 and for shouldered engagement and attachment to the socket end 30, as at 36.

The spindle driven part 16 is formed to include a hexagonal shape in cross-section on the end 38 which is received in the bore 34 of the holder part. It is slightly undersized with respect to the bore 34, but only enough to accommodate a coating 40 of hard, oil sintered plastic or the like of about .001 thickness about and on all faces of the hex shaped end.

The two parts of the tap driver 14 are held together by a coiled tension spring 42 which extends through a center hole 44, in the spindle driven part, and which is engaged to an end cap 46, at one end, and a cross pin 48 in an extension 50 of the center hole within the tool holder end 30. The spring load is not too strong and only such as is sufficient to hold the spindle driven part in bottomed engagement in the hex bore 34 for starting a tap and to allow for the separation and return of the parts in service.

A second form of the present invention is shown by the tap driver 114 in FIGS. 4–6. Its similarities to the tap driver 14 will be noted by the use of like reference numerals in the one hundred series for similar parts in the different tap drivers; as for example 16 and 116 for the spindle driven part, 18 and 118 for the tool holder part, etc. Consequently, the previous description as regards the retension of the spindle driven part in the spindle or adapter member, general construction of the tool holder part, use of a biasing spring, etc. will be appreciated as applying without a detailed description.

In particular, the tap driver 114 will be noted to include a roller bearing cage 60 on the end of the spindle driven part 116 in the holder part 118. The cage member is hexagonal in shape, of thin walled construction and is fitted within the annular space between the two parts which are sized to provide such space and a clearance allowing for relative movement with respect thereto.

A series of transversely disposed openings 72 are formed in the side walls of the bearing cage 60, in staggered relation with respect to next adjacent walls, and roller bearings 70 are provided in each opening of a dimensional size for centering the end of the spindle driven part 116 in the bore 134 of the holder part and providing for rolling contact therebetween. In the hex form proposed, with the openings 72 for the roller bearings staggered, a three face contact is obtained for drive and rolling engagement, at spaced locations axially and in circumferential alignment, to assure concentricity and to better absorb the reactionary forces when a tap freezes in a work piece.

The bearing cage 60, while relatively positionable on the spindle driven part in the tool holder, is held apart from the end of the bore hole 134 by a spacer spring 64 engaged with a snap ring 62 that provides a shoulder stop. The spring pressure is sufficiently light to allow the cage and its rollers to travel relatively down into the bore 134, as the driven and holder parts are separated, without bottoming out, and since the cage movement is only half that of the driving and holder parts, it need not be very long.

A wiper 68 and lock ring 66 at the open end of the holder part 118 afford a seal for the annular space therebetween and complete the assembly of tap driver 114.

In both of the tap driver embodiments shown, tooling costs for making the hexagonal bore, for small run production, may be minimized by forming the body part of the holder member in complementary halves, relative to the axis of the desired bore hole, and forming part of the hex form in each of the planar wall faces of such halves, by grinding, milling or such, and then securing the two halves together to provide the hex bore therebetween.

As will be appreciated, the male and female interfitting parts may be reversed, the telescoping parts may be retained together and allowed relative movement under the resistance of a compression spring or otherwise, and other complementary polygonal shapes besides the hex form may be used in the practice of the present invention and without departing from the broad scope to be accorded thereto. The embodiments shown and described are not to be considered as exclusive in realizing the advantages and benefits of the present invention.

What is claimed is:

1. A tap driver, comprising: a spindle driven member having a tapping tool receptive part axially aligned and formed for telescopic engagement therewith, spring means provided between said member and part for holding them together and allowing for relative axial movement and recovery therebetween, said part and member having a circumferentially disposed and axially extendable rotary drive connection therebetween including a plurality of angularly related planar surfaces extending axially along the telescopingly engageable length thereof and including anti-friction means disposed between at least some of said surfaces for reducing resistance to axial movement.

2. The tap driver of claim 1, said part and member having a like number of circumferentially disposed and interconnected planar wall faces and said rotary drive connection provided therebetween.

3. The tap driver of claim 2,
said part and member being hexagonal in cross-section and having said rotary drive connection provided on one thereof and being relatively moveable with respect to the other thereof in use.

4. The tap driver of claim 2,
said rotary drive connection including a roller bearing cage having roller bearing members provided circumferentially therearound and received in close fitting relation between the planar walls of said part and member.

5. The tap driver of claim 4,
said part member and bearing cage being hexagonal in cross-section and said roller bearing members being alternately staggered for circumferential alignment thereof between alternate planar faces of said part and member.

6. The tap driver of claim 3,
said rotary drive connection including a lubricant-impregnated material provided on one of said part and member.

7. The tap driver of claim 6,
said material being provided as a coating on one of said part and member.

References Cited

UNITED STATES PATENTS

| | | | |
|---|---|---|---|
| 2,429,564 | 10/1947 | Petersen | 10—89 |
| 2,772,094 | 11/1956 | Jamilkowski et al. | 10—129 |
| 3,113,329 | 12/1963 | Andres et al. | 10—129 |
| 3,220,030 | 11/1965 | Supernor | 10—129 |
| 3,311,180 | 3/1967 | Gilreath et al. | 64—23 |
| 3,318,170 | 5/1967 | Runkle | 64—23 |
| 3,325,837 | 6/1967 | Hartmann | 64—23 |

CHARLES W. LANHAM, Primary Examiner

E. M. COMBS, Assistant Examiner